United States Patent

Waldmann

(10) Patent No.: US 9,566,958 B2
(45) Date of Patent: Feb. 14, 2017

(54) DRIVER ASSISTANCE SYSTEM IN A MOTOR VEHICLE

(75) Inventor: Peter Waldmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 804 days.

(21) Appl. No.: 13/296,787

(22) Filed: Nov. 15, 2011

(65) Prior Publication Data

US 2012/0123644 A1 May 17, 2012

(30) Foreign Application Priority Data

Nov. 17, 2010 (DE) ........................ 10 2010 044 024

(51) Int. Cl.
| | |
|---|---|
| B60T 7/12 | (2006.01) |
| G06F 19/00 | (2011.01) |
| B60T 7/04 | (2006.01) |
| B60T 7/14 | (2006.01) |
| B60W 30/12 | (2006.01) |

(52) U.S. Cl.
CPC .................. B60T 7/042 (2013.01); B60T 7/14 (2013.01); B60W 30/12 (2013.01); B60W 2540/12 (2013.01); B60W 2710/182 (2013.01); B60W 2720/106 (2013.01)

(58) Field of Classification Search
CPC ...... B60T 13/00; B60T 15/022; B60T 15/041; B60T 17/00; B60T 17/086; B60T 17/18; B60T 17/20; B60T 17/22; B60T 2201/00; B60T 2201/082; B60T 2220/00; B60T 2220/04; B60T 2260/00; B60T 2270/00
USPC ............... 701/39, 43, 45, 48, 70–71, 78, 83; 307/142; 340/4.6, 426.32, 450.1, 340/452–453, 457.1, 457.3
See application file for complete search history.

(56) References Cited

U.S. PATENT DOCUMENTS

| | | | | |
|---|---|---|---|---|
| 4,787,205 A | * | 11/1988 | Fontaine | B60K 28/063 |
| | | | | 188/356 |
| 6,598,900 B2 | * | 7/2003 | Stanley | B60N 2/286 |
| | | | | 280/735 |
| 7,042,345 B2 | * | 5/2006 | Ellis | A61H 3/061 |
| | | | | 340/436 |

(Continued)

FOREIGN PATENT DOCUMENTS

| | | |
|---|---|---|
| CN | 2058647 U | 6/1990 |
| CN | 101801746 A | 8/2010 |

(Continued)

OTHER PUBLICATIONS

German Search Report dated Mar. 2, 2011 including partial English-language translation (Nine (9) pages).

(Continued)

*Primary Examiner* — Atul Trivedi
(74) *Attorney, Agent, or Firm* — Crowell & Moring LLP

(57) ABSTRACT

A driver assistance system in a motor vehicle includes an electronically controllable braking system and a control unit assigned to this braking system and connected with an operating element also assigned to the braking system. The operating element, when correspondingly actuated, can initiate an automatic braking function in the form of a normal braking by use of the electronically controllable braking system independently of the actuation of the brake pedal. The control unit is operatively configured such that, when the operating element is continuously actuated beyond a predefined minimum duration, an emergency braking function can be initiated.

17 Claims, 1 Drawing Sheet

(56) References Cited

U.S. PATENT DOCUMENTS

| | | | | |
|---|---|---|---|---|
| 7,828,104 | B2* | 11/2010 | Akaba | B60R 21/013 180/268 |
| 8,140,241 | B2* | 3/2012 | Takeda | B60W 30/16 701/70 |
| 8,655,564 | B2 | 2/2014 | Breuer et al. | |
| 2004/0209594 | A1* | 10/2004 | Naboulsi | G08B 21/06 455/404.1 |
| 2006/0001531 | A1* | 1/2006 | Waterman | B60Q 5/00 340/438 |
| 2006/0025897 | A1* | 2/2006 | Shostak | B60C 23/005 701/1 |
| 2006/0155469 | A1* | 7/2006 | Kawasaki | B60R 21/013 701/301 |
| 2007/0075919 | A1* | 4/2007 | Breed | B60R 21/013 345/8 |
| 2007/0100530 | A1* | 5/2007 | Mori | B60T 8/4872 701/70 |
| 2008/0091309 | A1* | 4/2008 | Walker | B60R 25/02 701/1 |
| 2008/0109137 | A1* | 5/2008 | Eberle | B60R 21/013 701/45 |
| 2008/0114519 | A1* | 5/2008 | DuFaux | B60T 7/16 701/70 |
| 2008/0133136 | A1* | 6/2008 | Breed | B60N 2/2863 701/301 |
| 2009/0198427 | A1* | 8/2009 | Christopher Jackson | B60T 7/122 701/70 |
| 2010/0169009 | A1* | 7/2010 | Breed | B60N 2/2863 701/301 |
| 2010/0318256 | A1* | 12/2010 | Breuer | B60T 7/22 701/31.4 |

FOREIGN PATENT DOCUMENTS

| | | |
|---|---|---|
| DE | 38 26 943 A1 | 2/1990 |
| DE | 102 20 566 A1 | 11/2003 |
| DE | 103 16 413 A1 | 10/2004 |
| DE | 10 2007 050 221 A1 | 4/2009 |
| WO | WO 01/32482 A1 | 5/2001 |

OTHER PUBLICATIONS

Caterina Schroeder, "SmartSenior—Intelligent Services for Seniors," Springer Fachmedien Wiesbaden GmbH 2012, http://www.atzonline.de/Aktuell/Nachrichten/1/9837/pr, Mar. 28, 2012, including English-language translation, (three (3) pages).

Chinese Office Action dated Sep. 26, 2014, with English translation (Nine (9) pages).

* cited by examiner

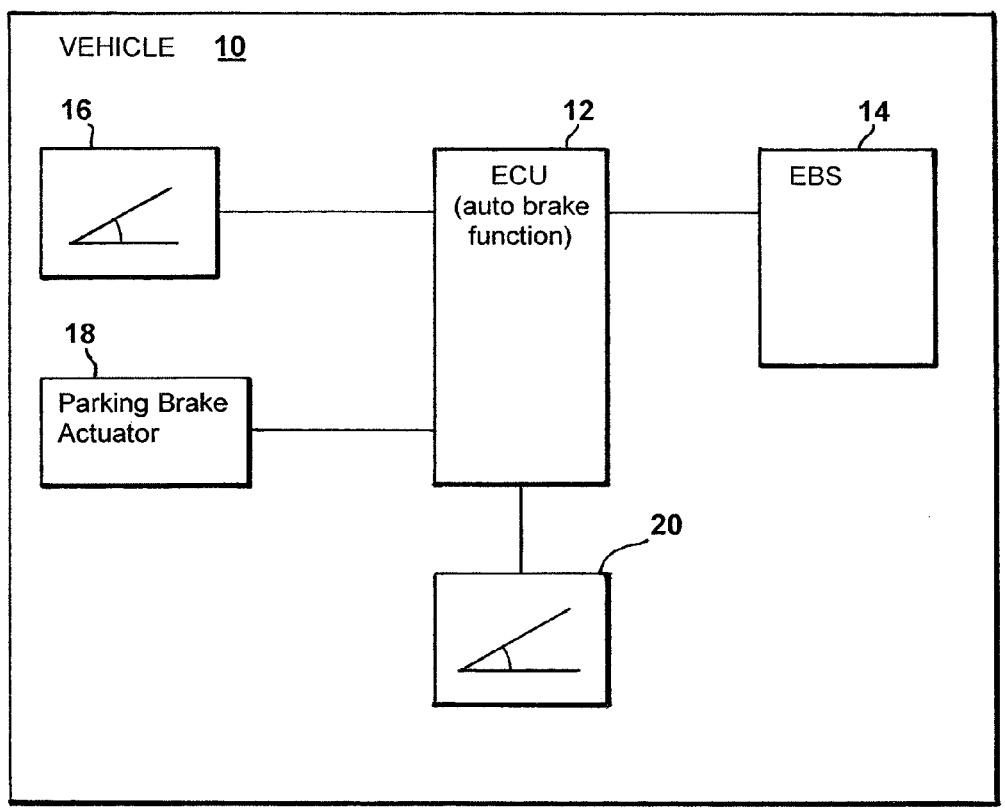

DRIVER ASSISTANCE SYSTEM IN A MOTOR VEHICLE

CROSS-REFERENCE TO RELATED APPLICATIONS

This application claims priority under 35 U.S.C. §119 from German Patent Application No. DE 10 2010 044 024.8, filed Nov. 17, 2010, the entire disclosure of which is herein expressly incorporated by reference.

BACKGROUND AND SUMMARY OF THE INVENTION

The invention relates to a driver assistance system in a motor vehicle and, more particularly, to a driver assistance system having an electronically controllable braking system and a control unit which is assigned to the braking system and is connected with an operating element also assigned to the braking system.

The known "SmartSenior—Intelligente Dienstleistungen für Senioren" ("SmartSenior—Intelligent Services for Seniors") research project is a research initiative that aims at making life easier and safer as people age. This includes emergency recognition and driving (driver) assistance systems that are independent of the location and also promote a feeling of safety in seniors on the road.

Older people with temporary heart or circulation problems frequently are no longer confident that they can drive their own vehicle. The reason is the fear that they may no longer be able to control their vehicle as a result of heart or circulation problems and may therefore cause a serious accident. This leads to a relinquishing of individual mobility and therefore, mainly in rural areas, to a loss of a considerable amount of self-determination and to a poorer quality of life. Often, this also applies to other groups of persons with certain health-related restrictions. It is therefore a design goal to completely avoid health-related losses of control—or to at least reduce the severity of accidents due to such loss of control.

Currently, an emergency driving (driver) assistance system (emergency stopping assistant) is therefore being developed which, when a health-related emergency situation involving the driver is detected, automatically changes into an autonomous driving mode and carries out a safeguarded emergency stopping maneuver. In simple terms: the car maneuvers to the side of the road in a controlled manner as a function of the surrounding traffic and then stops. Simultaneously, an emergency call is placed with attached relevant data for the initiation of the necessary medical and traffic-related rescue measures, and efficient emergency care is thereby made possible.

The emergency stopping assistant is based on sensors for monitoring vital data, along with the already existing driver assistant systems. For example, BMW® has been offering an emergency call function for as long as ten years. In addition to the exact position determination and information concerning the vehicle, the emergency call has, since the Spring of 2007, also contained information concerning the accident. Thus, helpers not only learn the exact location and can identify the vehicle but, for the purpose of assisting, are also provided with information concerning the number of occupants and the seriousness of injuries. An intelligent algorithm computes this information from the sensor data of the passive safety system (airbags, belts, etc.). By way of this networked technology, vital data can also be forwarded to a rescue management station. The determination of valid vital data is also handled within the "SmartSenior" Project. Driving (driver) assistance systems, such as the lane change warning system or the active speed control with a stop-and-go function, form a further technological basis for the development of the emergency stopping assistant.

In addition to the clarification of prevailing legal conditions, new algorithms have to be developed in a first step for the detection and interpretation of the vehicle surroundings. In this case, special emphasis is on a reliable localization of the vehicle within its own driving lane by the fusion of redundant sensors, the recognition of the objects around the vehicle and the development of an electronic coordinator which, in an emergency, instead of the driver, makes all driving-strategic decisions and forwards these decisions to the corresponding interfaces for the longitudinal and lateral control of the vehicle.

The so-called emergency stopping assistant first has to be able to recognize a health-related emergency on the part of the driver. It is only when an emergency has been recognized by way of the analysis of so-called vital data that the car is changed to an autonomous driving mode and carries out an emergency stopping maneuver. The reliable detection and correct analysis of the vital data have proven to be extremely difficult when implementing the project in the vehicle.

There is therefore needed an improved driver assistance system of the above-mentioned type.

According to the invention, this and other needs are met by a driver assistance system in a motor vehicle and, more particularly, to a driver assistance system having an electronically controllable braking system and a control unit which is assigned to the braking system and is connected with an operating element also assigned to the braking system. The operating element, when correspondingly actuated, can initiate an automatic braking function in the form of a normal braking by use of the electronically controllable braking system independently of the actuation of the brake pedal. The control unit is operatively configured such that, when the operating element is continuously actuated beyond a predefined minimum duration, an emergency braking function can be initiated.

The invention is based on the following considerations, recognitions and ideas.

Most BMW® vehicles do not have an installed mechanical handbrake. In this case, the function of the handbrake is taken over by an electronically controlled electromechanical parking brake (EMF). By pulling an operating element in the form of an actuator in the center console, the vehicle is braked to a standstill in a controlled manner. This can also be implemented by an interaction with a hydraulic electronically controllable braking system.

An operating element (for example, an actuator or a key that can be moved into one or more positions), which is assigned to a braking system and by which at least a normal braking can be initiated by means of the given operating mode, is therefore basically part of the invention.

The use of camera systems and electric adjusting motors in the steering system (EPS), as currently already installed in series-produced vehicles, makes it possible to guide/keep the vehicle within its own lane by automatic steering interventions (tracking systems, heading control).

If, in an emergency situation, for example, a health-related inability to drive of the person steering the vehicle, the handbrake function (EMF) is triggered by the front passenger, then the vehicle will in fact reduce its speed and brake to a standstill. However, there is a possibility that the vehicle may leave the road or its own driving lane on expressways. Furthermore, in such a situation, the driver may block the gas pedal with his foot and/or block the steering wheel with his body. This may lead to accidents.

As initially mentioned, camera systems and electric steering systems for tracking systems are already being installed in current series-produced vehicles. This permits a narrow and strong guidance of the vehicle within the current driving lane.

According to the invention, the braking function is expanded by way of the operating element (accommodated, for example, in the center console) which, in particular can be manually operated also by the front passenger, and in an advantageous further development, can be combined with an automated tracking system. As a result, particularly the front passenger is enabled to intervene himself in the event of the driver's suddenly occurring inability to drive.

In a further development, the tracking system can be expanded in the direction of an autonomous driving, as in the case of the known emergency stopping assistant, so that the vehicle can be changed fully autonomously into a secure condition while taking into account the other traffic participants (for example: 1. Staying in the lane; 2. Changing the lane; 3. Stopping on the hard shoulder; 4. Sending the emergency call) as long as the operating element is continuously actuated (by the front passenger) in a predefined manner.

In contrast to the known emergency stopping assistants, emergency driver assistance functions in a simplifying manner are not activated by analyzing vital data but as a function of a manual triggering of an operating element by the front passenger.

Serious accidents can thereby be avoided. Such an assistance system also provides an insecure driver with the certainty that, if necessary, the front passenger could safely stop the vehicle.

Accordingly, the driver assistance system according to the invention is based on an electronically controllable braking system and a control unit assigned to this braking system, which control unit is connected with an operating element also assigned to the braking system. By a corresponding actuation of the operating element, an automatic braking function can be initiated in the form of a normal braking by use of the electronically controllable braking system independently of the actuation of the brake pedal. According to the invention, the control unit is further developed, particularly by a corresponding software programming, such that, when the operating element is continuously actuated beyond a (first) predefined minimum duration, an emergency braking function can be initiated.

The emergency braking function preferably includes a deceleration that is intensified in comparison to a normal braking and/or an automatic switching-on of the emergency flasher system, for example, in the form of graded emergency measures as a function of the duration of the actuation of the operating element.

In a further development of the driver assistance system according to the invention, the vehicle has a tracking system, and the emergency braking system activates this tracking system. Tracking systems are known per se.

An intensified deceleration within the scope of the emergency braking function preferably takes place as a function of a simultaneous actuation of the gas pedal. For example, the intensified deceleration can be defined to a greater degree if the gas pedal is actuated than if the gas pedal is not actuated, because it can then be assumed that it is highly probable that the driver is unable to drive and is blocking the gas pedal with his foot. In this case, the position of the gas pedal as the desired-performance element will be ignored.

The emergency braking function may also include the initiation of a (known) emergency stopping assistance function independently of the driver's vital data, for example, after a preceding intensified deceleration for a defined period of time.

The emergency braking function may also include the activation of a belt tightener function at the driver's seat and/or an adjustment of the driver's seat into the rearward end position. The belt tightener function is preferably activated first and, in the event of a still longer actuation of the operating element beyond a second predefined minimum duration, the driver's seat is then moved into the rearward end position in order to, if necessary, eliminate the blockage of the steering wheel by the driver's upper body.

A continuous actuation of the operating element may also exist if, after a brief release, the operating element is actuated again. In this case, "brief" indicates a range of seconds during which the front passenger may accidentally slide off the operating element, for example, because of nervousness.

Other objects, advantages and novel features of the present invention will become apparent from the following detailed description of one or more preferred embodiments when considered in conjunction with the accompanying drawings.

BRIEF DESCRIPTION OF THE DRAWINGS

The FIGURE is a simplified schematic block diagram of a motor vehicle having a driver assistance system.

DETAILED DESCRIPTION OF THE DRAWINGS

Referring to the FIGURE, a motor vehicle 10 includes an electronic control unit 12 for implementing an automatic braking function by way of an electronically controllable braking system 14 independently of the actuation of the brake pedal 16. A 7-Series, Model 2010 vehicle of BMW®, having an electromechanical parking brake, for example, is one such motor vehicle. In this case, the control unit 12 is connected with an operating element 18 in the form of a parking brake actuator which is assigned to the braking system and can be actuated by pulling or pushing. In the state of the art, a pulling of the parking brake actuator results in an immediate deceleration with a predefined gradient, which in the following will be called a normal braking.

According to an embodiment of the invention, in the case of such a motor vehicle, the actuating of the gas pedal 20 is at first basically ignored as soon as the parking brake actuator 18 is operated; here, for example, in the form of a pulling of the actuator. This means that when the actuator 18 is pulled, the control unit 12 will react as if the driver had released the gas pedal; the vehicle therefore changes into a coasting operation, whereby the engine brake is already activated.

An exemplary gas pedal dependency will be described in the following. When the parking brake actuator 18 is continuously actuated—thus, continuously actuated beyond a predefined minimum duration (of, for example, more than 10 seconds)—a deceleration is maintained or initiated ("normal braking") according to the state of the art while the gas pedal 20 is not actuated. When the parking brake actuator is continuously actuated without any interruption—thus, continuously actuated beyond a predefined minimum duration (of, for example, more than 10 seconds)—, a deceleration will be initiated that is increased in comparison to normal braking ("emergency braking" of the emergency braking function) while the gas pedal 20 is actuated. With the initiation of the emergency braking, the emergency flasher system is preferably also switched on.

In addition or as an alternative, an increasingly intensified deceleration can also be controlled in as a function of the duration of the actuation of the operating element, in which case this can also take place independently of the gas pedal actuation.

In a preferred further development of the embodiment according to the invention, at least one tracking function is also activated simultaneously with the initiation of the emergency braking.

In a continued expansion, after a further defined time period, in which the emergency braking is carried out first, triggered only by the predefined actuation of the operating element, the known above-described emergency stopping assistant could be activated independently of the driver's vital data.

Also, simultaneously with the initiation of the emergency braking function by the predefined actuation of the operating element, at least also the driver's belt-tightening system can be automatically tightened in order to, if necessary, eliminate a blocking of the steering wheel by the driver's upper body. Finally, for the same reason, for example, in the case of an even longer actuating of the operating element beyond a second predefined minimum duration, the driver's seat can also be moved into the rearward end position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system in a motor vehicle, comprising:
   an electronically controllable braking system;
   an operating element in the motor vehicle assigned to the electronically controllable braking system;
   a control unit, in the motor vehicle, operatively coupled to the electronically controllable braking system and the operating element, wherein when the operating element is actuated, an automatic braking function is initiated to carry out normal braking via the electronically controllable braking system independent of any actuation of a brake pedal; and
   wherein the control unit is operatively configured such that, when the operating element is continuously actuated beyond a predefined minimum duration, an emergency braking function is initiated via the electronically controllable braking system.

2. The driver assistance system according to claim 1, wherein the emergency braking function comprises an intensified deceleration compared to the normal braking.

3. The driver assistance system according to claim 2, wherein the emergency braking function further comprises an automatic switching-on of an emergency flasher system.

4. The driver assistance system according to claim 3, further comprising:
   a tracking system of the motor vehicle; and
   wherein the emergency braking function comprises an activation of the tracking system.

5. The driver assistance system according to claim 1, wherein the emergency braking function comprises an automatic switching-on of the emergency flasher system.

6. The driver assistance system according to claim 1, further comprising:
   a tracking system of the motor vehicle; and
   wherein the emergency braking function comprises an activation of the tracking system.

7. The driver assistance system according to claim 1, wherein an intensified deceleration takes place as a function of a simultaneous actuation of a gas pedal of the motor vehicle.

8. The driver assistance system according to claim 1, further comprising:
   an emergency stopping assistant; and
   wherein the emergency braking function comprises an initiation of the emergency stopping assistant independent of a driver's vital data.

9. The driver assistance system according to claim 1, wherein the emergency braking function further comprises an activation of a belt tightening function at a driver's seat of the motor vehicle.

10. The driver assistance system according to claim 9, wherein the emergency braking function further comprises an adjustment of a driver's seat of the motor vehicle into a rearward end position.

11. The driver assistance system according to claim 10, wherein the adjustment of the driver's seat into the rearward end position occurs only when the operating element is actuated beyond a second predefined minimum duration.

12. The driver assistance system according to claim 1, wherein, only when the operating element is actuated beyond a second predefined minimum duration, a driver's seat is moved into a rearward end position.

13. A method of operating a motor vehicle having an electronically controllable braking system and a control unit assigned to the braking system and coupled with an operating element in the motor vehicle also assigned to the braking system, the method comprising the acts of:
   controlling the electronically controllable braking system independently of an actuation of a gas pedal of the motor vehicle to initiate an automatic braking function in the form of a normal braking when a first operating element signal is received; and
   initiating an emergency braking function by way of the electronically controllable braking system independently of the actuation of the brake pedal when a second operating signal is received.

14. The method according to claim 13, wherein the second operating signal is defined by a continuous actuation of the operating element beyond a predefined minimum duration.

15. The method according to claim 13, wherein the act of initiating the emergency braking function is carried out by at least one of an intensified deceleration compared to the normal braking and an automatic switching-on of an emergency flasher system.

16. The method according to claim 13, wherein the initiating of the emergency braking function is further carried out by activating a tracking system of the motor vehicle.

17. The method according to claim 13, wherein the initiating of the emergency braking function is further carried out by at least one of activating a belt tightening function at a driver's seat of the vehicle and an adjustment of the driver's seat into a rearward end position.

* * * * *